United States Patent
Kourosh

(10) Patent No.: US 7,305,892 B2
(45) Date of Patent: Dec. 11, 2007

(54) METHOD FOR OPERATING A MASS FLOWMETER

(75) Inventor: Kolahi Kourosh, Kiel (DE)

(73) Assignee: Krohne AG, Basel (CH)

( * ) Notice: Subject to any disclaimer, the term of this patent is extended or adjusted under 35 U.S.C. 154(b) by 29 days.

(21) Appl. No.: 11/352,502

(22) Filed: Feb. 10, 2006

(65) Prior Publication Data

US 2006/0179956 A1   Aug. 17, 2006

(30) Foreign Application Priority Data

Feb. 16, 2005   (DE) .................. 10 2005 007 171
Mar. 16, 2005   (DE) .................. 10 2005 012 505

(51) Int. Cl.
   *G01F 1/84* (2006.01)
(52) U.S. Cl. .................. 73/861.357; 73/861.355
(58) Field of Classification Search .................. None
   See application file for complete search history.

(56) References Cited

U.S. PATENT DOCUMENTS

| | | | | |
|---|---|---|---|---|
| 5,373,745 A * | 12/1994 | Cage | ............ | 73/861.356 |
| 6,196,058 B1 * | 3/2001 | Chen | ............ | 73/54.04 |
| 6,456,057 B1 * | 9/2002 | Weber et al. | ............ | 324/76.52 |
| 6,487,507 B1 * | 11/2002 | Mansfield et al. | ............ | 702/45 |
| 6,505,519 B2 * | 1/2003 | Henry et al. | ............ | 73/861.356 |
| 6,507,791 B2 * | 1/2003 | Henry et al. | ............ | 702/45 |

FOREIGN PATENT DOCUMENTS

EP   0895581 B1   12/2001
EP   0803050 B1   5/2003

OTHER PUBLICATIONS

Von Prof. Dr. Sc. Nat. Otto Fiedler Strömungsund Durchflußmeßtechnik, R. Oldenbourg Verlag München Wien. 1992.

* cited by examiner

*Primary Examiner*—Harshad Patel
(74) *Attorney, Agent, or Firm*—Cesari & McKenna, LLP

(57) ABSTRACT

A method is disclosed for operating a mass flowmeter that employs the Coriolis principle and that incorporates a measuring tube through which flows a fluid medium, which measuring tube is stimulated to oscillate in a predefined pattern, allowing the resulting oscillatory response of the measuring tube to be detected and measured. The drive power level required for stimulating the measuring tube to oscillate at a predefined frequency is quantified and with the aid of the quantified drive power, the presence of a multiphase flow of the medium traveling through the measuring tube is detected. In this fashion, it is possible to significantly improve the measuring accuracy and dependability of the measuring procedure.

9 Claims, 7 Drawing Sheets

METHOD FOR OPERATING A MASS FLOWMETER

BACKGROUND OF THE INVENTION

This invention relates to a method for operating a mass flowmeter that employs the Coriolis principle, said mass flowmeter incorporating a measuring tube through which flows a fluid medium and which is stimulated to oscillate in a predefined pattern, allowing the resulting oscillatory response of the measuring tube to be detected and measured.

Coriolis mass flowmeters operated by the method referred to above have been well known in prior art, as described, for instance, in DE 100 02 635 A1. Conventional Coriolis mass flowmeters often employ natural self-resonance, i.e. the measuring tube is energized at a self-resonant frequency, hereinafter also referred to as the natural frequency or mode, with a predefined amplitude.

In single-phase flow-through operation, conventional Coriolis mass flowmeters are highly accurate and very dependable. However, multiphase flow patterns of the medium traveling through the measuring tube can lead to a significant decline of the accuracy and dependability of the Coriolis mass flowmeter. In general, a multiphase flow pattern is constituted of two or more phases each of which features different physical properties. In any such case, the phases may consist of identical or of different substances. The term phases relates to homogeneous, spatially delimited segments of the flowing medium. Examples of a multiphase flow include fluid-and-solids combinations, gas-and-liquid combinations, gas-and-solids combinations, water-and-vapor combinations as well as water-and-air combinations.

As indicated above, multiphase flow measurements can be susceptible to significant errors. The primary cause is the presence of secondary flows in the measuring tube which are essentially attributable to mutually diverging densities of the different phases in the multiphase flow.

SUMMARY OF THE INVENTION

This invention is therefore aimed at introducing a method for operating a mass flowmeter that permits the detection and, preferably, comprehensive compensation for the presence of a multiphase flow.

Building on the above-described method for operating a mass flowmeter, the method according to this invention is characterized in that the energy level needed for producing the predefined oscillation frequency of the measuring tube is measured and that by means of the drive-power measurement thus obtained, the presence of a multiphase flow of the medium passing through the measuring tube is detected.

In other words, the invention provides for the drive power level needed for producing the predefined oscillation of the measuring tube to be used for determining whether the medium flowing through the measuring tube contains multiphase flow constituents, so that through a specific variation of that necessary energy level it is possible to identify the flow pattern involved. If the presence of a multiphase flow is detected, the information concerned is preferably provided in the form of a binary signal.

In one preferred embodiment of the invention, the viscosity of the medium flowing through the measuring tube is determined, on the basis of which the power dissipation caused by that viscosity is established, whereupon the energy loss occasioned by the presence of a multiphase flow is determined by subtracting from the original energy level the viscosity-related power dissipation as well as the energy loss caused in exciting the measuring tube to the predefined oscillation pattern due to the prevailing electrical, electromechanical and mechanical factors. The power dissipation caused by electrical, electromechanical and mechanical factors is determined based on the energy level needed to maintain the predefined oscillation pattern of the measuring tube when no medium flows through it. Such determination can be made, for instance, as part of the calibration of the Coriolis mass flowmeter prior to its flow-measuring operation. Once the viscosity of the medium flowing through the measuring tube is known, it is also possible to determine the energy loss caused by the internal friction of the medium as it flows through the measuring tube. Subtracting these various energy losses from the energy level needed to cause the measuring tube to oscillate permits the quantification of the power dissipation originating from the presence of a multiphase flow, i.e. from the aforementioned radial secondary flow.

The viscosity of the medium flowing through the measuring tube can, in essence, be measured by any conventional method. In a preferred implementation of the invention, however, the viscosity of the medium flowing through the measuring tube is determined as a function of the pressure drop over the length of the measuring tube. One preferred embodiment of the invention further provides for the pressure drop along the measuring tube to be determined by an evaluation of the oscillatory response of the measuring tube on the basis of a physical-mathematical model. In a further preferred embodiment of the invention, the physical-mathematical model is capable of describing the oscillation of the mass flowmeter when stimulated at a minimum of two mutually different natural frequencies. As an added preferred feature, the physical-mathematical model compensates for any coupling between the two natural frequencies.

A preferred embodiment of the invention further permits the power dissipation caused by the presence of a multiphase flow to be used for determining a value for the radially differing secondary flow. That value can serve as a measure of the volume current and/or the mass current and is preferably indicated and read-out for further processing.

A preferred embodiment of the invention further permits the determination of the density of the medium flowing through the measuring tube, again preferably by means of a physical-mathematical model of the oscillation of the mass flowmeter.

Finally, in the case of a dual-phase flow, a preferred embodiment of the invention provides for the use of the frequency spectrum of the measured secondary-flow signal as an indicator of the flow-phase distribution and/or as a measure of the proportion of a flow phase. This will be particularly useful in the case of a major density difference as for instance in gas-and-liquid flows, permitting the determination of such parameters as the type and size of gas bubbles.

There are numerous ways in which the method according to this invention can be implemented and further enhanced. In this context, attention is invited to the dependent claims and to the following detailed description of a preferred embodiment of the invention.

BRIEF DESCRIPTION OF THE DRAWINGS

The invention description below refers to the accompanying drawings, of which.

DETAILED DESCRIPTION OF A PREFERRED EMBODIMENT

Figure 1:
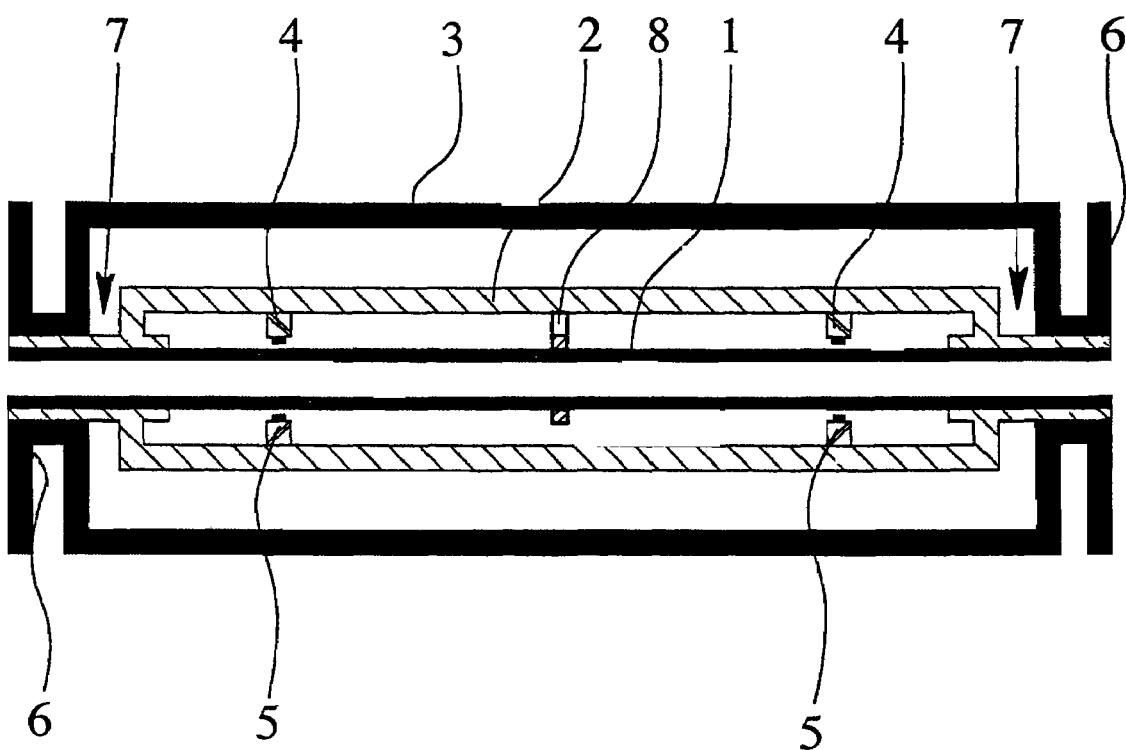
FIG. 1 shows the mechanical configuration of a Coriolis mass flowmeter for use with the preferred embodiment of the invention.

FIG. 1 is a cross-sectional view of a Coriolis mass flowmeter for use with the method, described below, in a preferred embodiment of the invention. The Coriolis mass flowmeter incorporates a measuring tube 1, a support pipe 2, a tubular shield 3, two oscillation generators 4 and two oscillation sensors 5. The measuring tube 1 in the instrument is of a straight linear design, permitting integration, via flanges 6, into an existing pipeline system, not illustrated. The connection between the flanges 6 and the pipeline system to the measuring tube 1 and the support pipe 2 is established by way of sections referred to as suspensions 7. In addition, a center spring 8 provided in the center of the measuring tube 1 connects the measuring tube 1 with the support pipe 2, enhancing the stiffness of the measuring tube 1 as described for instance in DE 42 00 060 A1. It should be noted that the invention is not limited to the configuration shown in FIG. 1. It applies instead to essentially all tube geometries including dual-tube designs.

Figure 2:
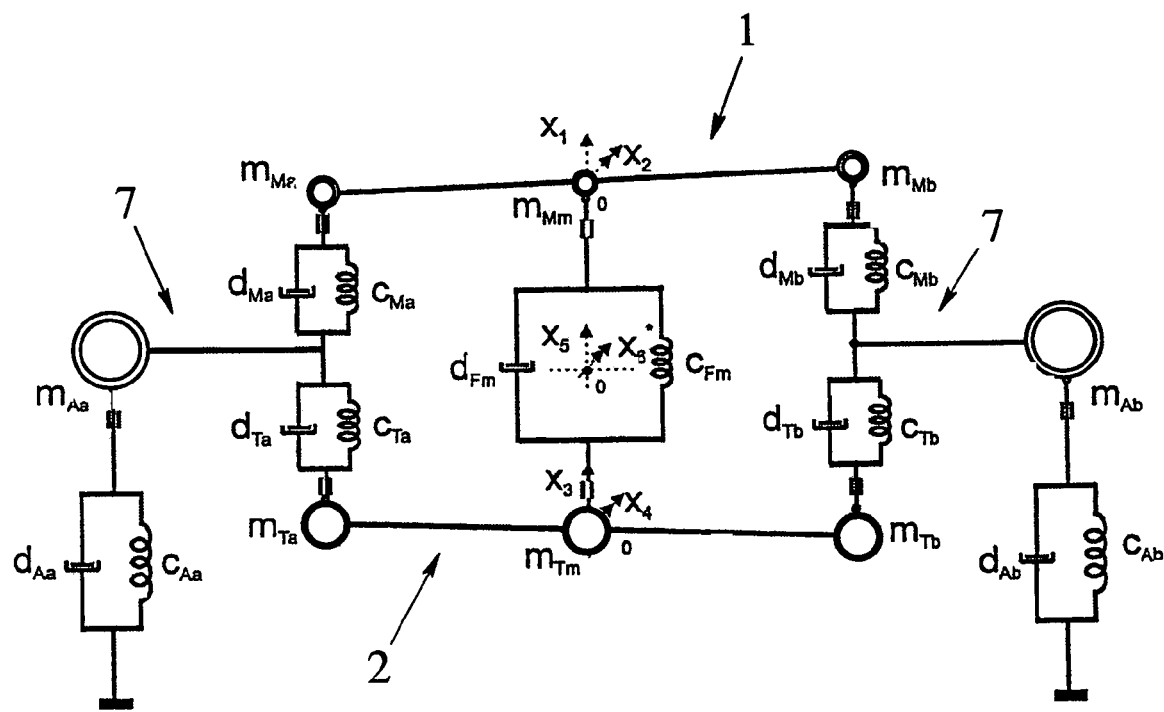
FIG. 2 outlines one version of a physical-mathematical model including concentrated substitute elements.

FIG. 2 shows a design version of the physical-mathematical model as employed in this example, with concentrated substitute elements reflecting the Coriolis mass flowmeter. The major mechanical movements of the Coriolis mass flowmeter, indicated in FIG. 1, include the oscillations of the measuring tube 1 and of the support pipe 2 in their first and, respectively, second self-resonant or natural mode. These can be described with the aid of the oscillation pattern of the model shown in FIG. 2. In this case, the substitute elements marked M relate to the effective mass, springs and attenuators of the measuring tube 1 while the elements marked T relate to the corresponding parameters of the support pipe 2. The mass, spring and attenuator substitute elements marked A relate to the suspensions 7. The indices a and b represent the left and, respectively, right half of the measuring tube 1, the support pipe 2 and the suspensions 7. The spring and attenuator marked Fm account for the fact that the measuring tube 1 is centrally positioned and supported via the center spring 8. Of course, if no center spring 8 is used, the corresponding references do not apply. The mass elements marked m account for the fact that the oscillations in the first self-resonant mode of the measuring tube and, respectively, of the support pipe involve a larger mass than do the oscillations in the second self-resonant mode.

In this model, a first natural-frequency oscillation reflects the cophasal translational movement of the masses of the measuring tube 1, of the support pipe 2 and, respectively, of the suspensions 7. One revolution of the outer masses a and b around the axes of rotation $x_2$, $x_4$ and $x_6$ corresponds to one oscillation at the second natural frequency. The mathematical description of the oscillation pattern of this system can be derived with the aid of the $2^{nd}$ Lagrange equation as performed in detail at the end of this description.

Figure 3:
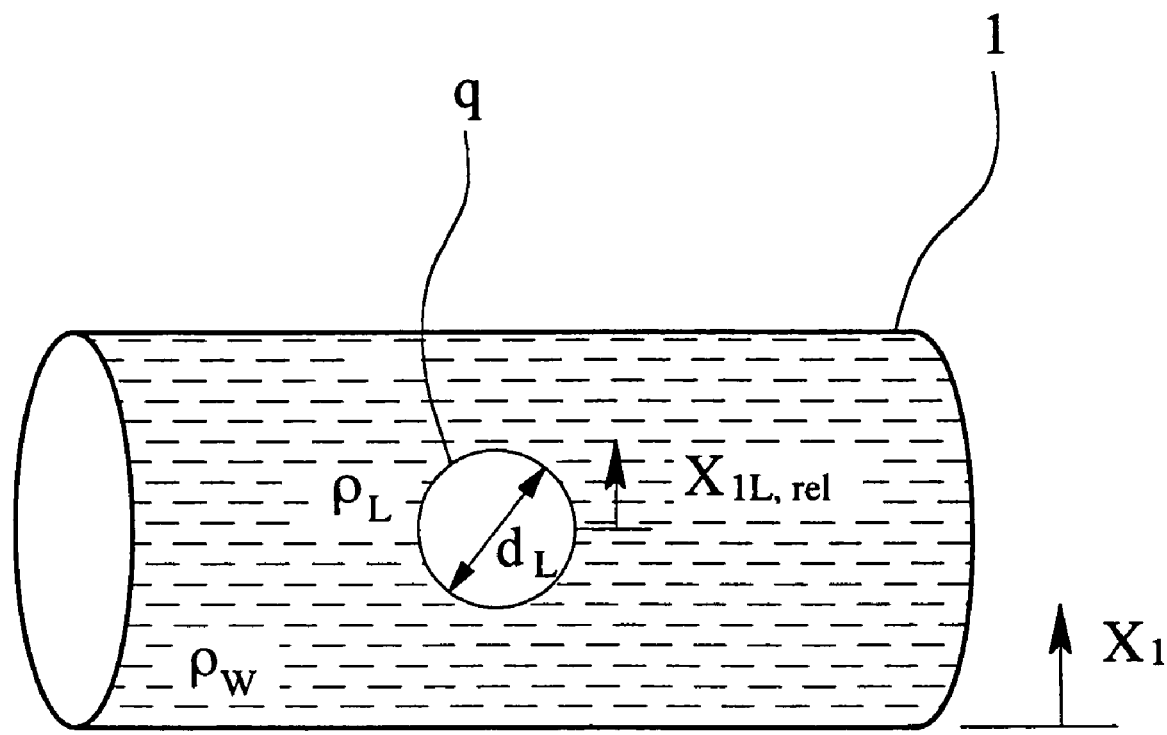
FIG. 3 is a schematic illustration of the behavior of an air bubble in the water-filled measuring tube of a Coriolis mass flowmeter.

As stated further above, applications involving multiphase flows can be fraught with substantial measuring errors due primarily to secondary flows in the measuring tube as a result of the diverging densities of the different phases in multiphase flows. FIG. 3 reflects a simplified example of that phenomenon, represented in this case by a spherical air bubble q in the center of a water-filled measuring tube 1. The measuring tube 1 is accelerated into transversal oscillations in its first self-resonant mode. In the process, the air bubble is exposed to a variety of impinging forces. The force equilibrium for the air bubble q is as follows:

$$\underbrace{\rho_L V_L \ddot{x}_{1L,rel}}_{[1]} + \underbrace{\frac{1}{2} C_D \rho w A_L \dot{x}_{1L,rel}^2}_{[2]} + \underbrace{C_a \rho w V_L \ddot{x}_{1L,rel}}_{[3]} = \underbrace{(\rho_w - \rho_L) V_L \ddot{x}_1}_{[4]}, \quad (1)$$

where, for simplicity's sake, the gravity and compressibility of the air bubble q have been disregarded at this particular point. The symbols represent the following:

$\ddot{x}_1$ = acceleration of the measuring tube
$\ddot{x}_{1L,rel}$ = relative acceleration of the air bubble
$\dot{x}_{1L,rel}$ = relative acceleration of the air bubble
$\rho_L$, $\rho_W$ = air-bubble density, water density
$V_L$ = air-bubble volume
$d_L$ = air-bubble diameter
$A_L$ = air-bubble cross-sectional surface
$C_D$ = coefficient of resistance
$C_a$ = coefficient of added mass
Expression [1]:=inertial force of the air-bubble mass
Expression [2]:=drag
Expression [3]:=added-mass inertial force, which is added since a relative acceleration of the air bubble requires an acceleration of a certain volume of water;
Expression [4]:="updrift", i.e. the external force acting on the air bubble.

Equation (1) describes an air bubble in a field of constant acceleration. In the case of variable acceleration, the momentary resistance depends not only on the momentary velocity and the momentary acceleration but also on the flow condition preceding these. This "prior history" is generally taken into account by applying the so-called Basset term which reads as follows:

$$\frac{3}{2} d_L^2 \sqrt{\pi \rho_w \eta_W} \int_{-\infty}^{t} \ddot{x}_{1L,rel} \frac{ds}{t-s}, \quad (2)$$

where $\eta_w$ is the viscosity of the water and (t-s) is the time elapsed since the last acceleration. The formula for the integer derives from the eddy formation in the water due to the movement of the bubble. The Basset term is of particular significance for solids. Because of their rigid boundary interface their relative movement causes especially strong eddying. In the case of gas bubbles with a resilient interface, there is a substantially weaker vortex effect.

As is evident from Equation (1), there is a relative movement of the air bubble q vis-à-vis the water. That movement of the air bubble q is more easily understood when one equates the acceleration generated by the stimulation of the measuring tube to the acceleration of the earth. In this case, the inertial acceleration of the air bubble q corresponds to the acceleration of the earth, and in the same way in which the air bubble within the gravitational field of the earth moves upward against the gravitational force, the air bubble q in the case of the accelerated measuring tube migrates against the inertial acceleration. The underlying cause of this phenomenon is the density difference between the air bubble q and the water surrounding it.

Since in the course of the oscillation the air bubble q travels ahead of the water it displaces the water in front of it, which then flows back in the opposite direction at the relative speed $\dot{x}_{1L,rel}$ of the air bubble q. The effect of these relative movements is as follows:

1. As a result of the relative speed, the externally impressed, predefined oscillation rate needed for generating the Coriolis force is reduced for the flow phase having the greater density. In other words, the induced Coriolis force is diminished compared to that without a relative speed. Expressed in different terms, the center of gravity of the medium in the measuring tube 1 moves with a smaller amplitude than would otherwise be expected due to the oscillatory stimulation. As a consequence, the mass-flow measurement obtained is too low.

2. The energy potential needed for the relative movement is taken from the oscillation generator that serves to stimulate the oscillation. That energy potential can be significantly larger than the power dissipated in the measuring tube 1 due to attenuation.

3. For the flow phase having the greater density, the relative movements have the effect of a baffle whose retaining surface is modulated at twice the frequency of the oscillation due to the two zero acceleration passes within one oscillation cycle. That creates a pulsating pressure drop determined by the density difference $\Delta\rho$ in the dual-phase flow:

$$\Delta p_{MP} = f(\Delta\rho). \quad (3)$$

This pressure drop is overlaid on the pressure drop caused by the flow viscosity $\eta$ described below. Consequently, the pressure drop in the measuring tube 1 can be expressed as the sum of the two pressure drops:

$$\Delta p = \Delta p_\eta(\eta) + \Delta p_{MP}(\Delta\rho). \quad (4)$$

These three effects of a multiphase flow are now utilized for pinpointing phenomena associated with multiphase flows such as air bubbles and/or for quantifying the volume- or mass-based proportion of the flow phase concerned, as well as for a better determination of the mass current, the density differences and the density itself.

If the viscosity is known, the drive power level can serve as an indicator of a dual-phase flow. The oscillation generators 4 apply an excitation force $F_a$, corresponding to the predefined drive-power level $P_a$, on the measuring tube 1. The drive power compensates for the energy loss of the oscillating system due to electrical and electromechanical factors as well as mechanical and fluidic friction. To achieve the highest possible velocity, impressed on the particles of the medium, and thus highest possible effectiveness, the setpoint for the drive-power level $P_a$ is preferably defined in such fashion as to prevent idle-power generation as much as possible. What this means is that for generating the Coriolis forces, the measuring tube 1 is preferably driven at its lowest resonant frequency.

For stimulating the measuring tube 1, i.e. for impressing a steady-state oscillation preferably at its self-resonant frequency, the excitation force $F_a$ is generated using traditional methods such as phase and amplitude regulation for autonomous oscillators. The concept and use of such phase and amplitude controls for operating measuring tubes at one of their mechanical resonance frequencies have been well established in the prior art. In a preferred embodiment of the invention, the amplitude, phase and frequency control algorithms are implemented using a digital signal processor (DSP) or microcontroller ($\mu$C). It is possible, of course, to employ other established control algorithms as well as implementation components.

The drive power level at the resonant frequency serves as a measure for the entirety of the proportionally velocity-related power dissipation of the oscillating system. This power dissipation can generally be broken down into three components:

$$P_a = P_{me} + P_\eta + P_{MP}, \quad (5)$$

where $P_a$:=drive power level $P_{me}$:=electrical, electromechanical and mechanical losses $P_\eta$:=viscosity-related friction losses $P_{MP}$:=radial losses due to the relative movement of the flow phases (multiphase flow-related losses).

The $P_{me}$ component constitutes the power dissipation without the effect of the medium or the flow. This power dissipation, also referred to as the no-load energy loss, attributable to the effect of electrical, electromechanical and mechanical factors, can be predetermined, for instance during the calibration of the mass flowmeter, and suitably taken into account during flow measurements. The $P_\eta$ component represents the viscosity-related friction losses. As described in U.S. Pat. No. 4,524,610 or in EP 1 291 639 A1, that power dissipation is proportional to the viscosity:

$$P_\eta \propto \eta. \quad (6)$$

It should be noted that in EP 1 291 639 the entire power dissipation save for the no-load loss, expressed in relation to the standard deviation, is attributed to viscosity and serves as a basis for calculating the viscosity. The effect of the heterogeneities of the flow on the power dissipation and thus on the viscosity determination is calculated via the standard deviation of the power dissipation. The assumption is made that the heterogeneity of the flow does not contribute to the mean value of the power dissipation. As a result, even a small air-bubble constituent in the flow delivers high viscosity values.

If the viscosity is measured directly or indirectly, and if in a preferred, simple model version the proportionality factor and the zero point are predetermined, for instance during the calibration of the Coriolis mass flowmeter in a single-phase flow such as a flow of water, the viscosity-related power dissipation can be calculated using the formula $P_\eta = K_{\eta 1}\eta + K_{\eta 0}$. Equation (5) thus also permits the calculation of power losses associated with multiphase flows: $P_{MP} = P_a - P_{me} - P_\eta$. As a first step, it indicates the presence of a dual-phase flow, i.e. the presence of gas bubbles, allowing for the generation and output of a corresponding binary signal.

At this juncture, it should be stressed that for implementing the invention the drive power level can be determined in a variety of ways known to those skilled in the art, such as current-voltage measurements or based on control-circuit reference setpoint values.

The viscosity can be determined by any traditional measuring method. However, the method described below is preferred:

The viscosity of a medium, also known as its viscidity, is the characteristic quality of the medium to resist the shifting of two mutually neighboring layers of the medium relative to each other, a phenomenon also referred to as internal friction. The result is a resistance to flow, which exists not only for liquids but for gases as well and even for solids. The dynamic viscosity η is referred to as the proportionality factor between the transverse stress and the shearing speed, i.e. the shear rate during the flow. Dividing the dynamic viscosity by the density of the medium results in the kinematic viscosity.

Figure 4:
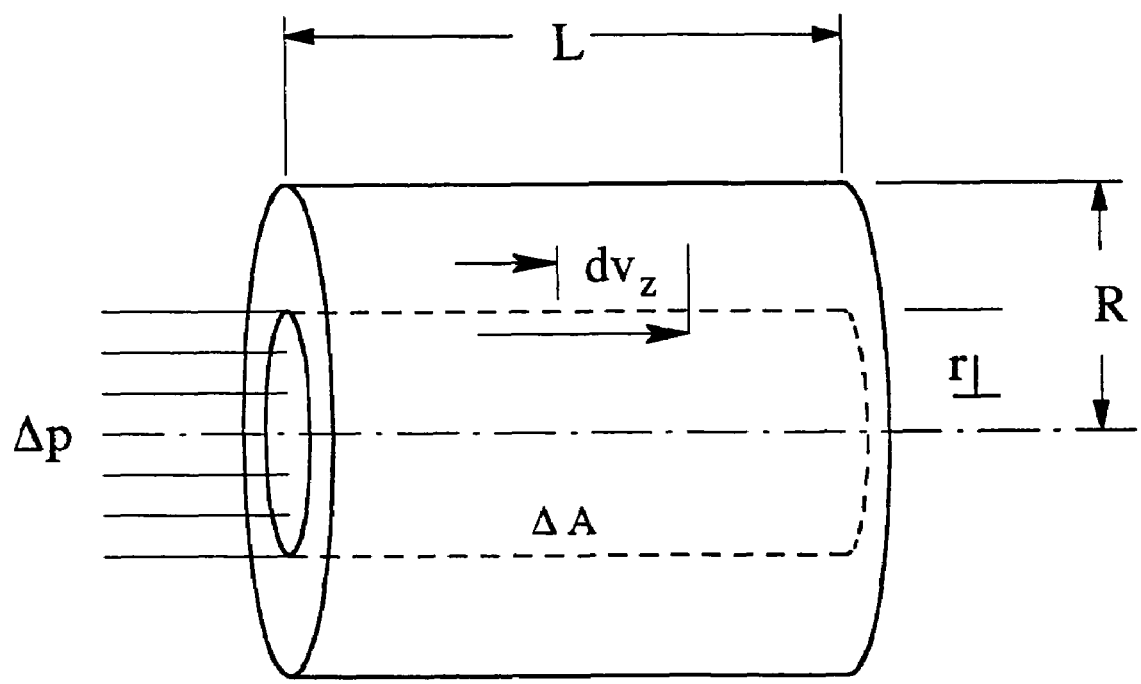
FIG. 4 is a graph showing the friction between neighboring surface areas of a medium flowing through the measuring tube of a Coriolis mass flowmeter.

FIG. 4 is a diagrammatic illustration of the friction between two mutually interfacing flow segments in a laminar flow. In a laminar flow, there is equilibrium in the flow direction between the frictional force $F_W$ exerted upon each other by mutually interfacing flow segments $\Delta A$ moving at different speeds, and the force of pressure F that drives the segments past each other as follows:

$$F_W = \eta \frac{dv_Z}{dr_\perp} \cdot \Delta A, \tag{7}$$

where $dv_Z/dr_\perp$ describes the velocity gradient between the flow segments, with F representing the force of pressure:

$$F = \Delta p \cdot \pi r_\perp^2. \tag{8}$$

The result is a differential equation for the velocity pattern:

$$\frac{dv_Z}{dr_\perp} = \frac{r_\perp}{2\eta} \cdot \frac{\Delta p}{L} \tag{9}$$

the solution being $$v_Z = \frac{1}{4\eta}(R^2 - (r_\perp)^2) \cdot \frac{\Delta p}{L}, \tag{10}$$

where R stands for the radius of the measuring tube. This flow profile is a paraboloid whose crest values are:

$$v_Z(r_\perp = 0) = \frac{R^2}{4\eta} \cdot \frac{\Delta p}{L} \text{ and } v_Z(r_\perp = R) = 0. \tag{11}$$

What this means is that the pressure p acting on the inner liquid cylinder drives the latter through the outer cylinder with a velocity difference of $dv_Z$, while the frictional force $F_W$ is generated at the $\Delta A$ interface.

Figure 5:
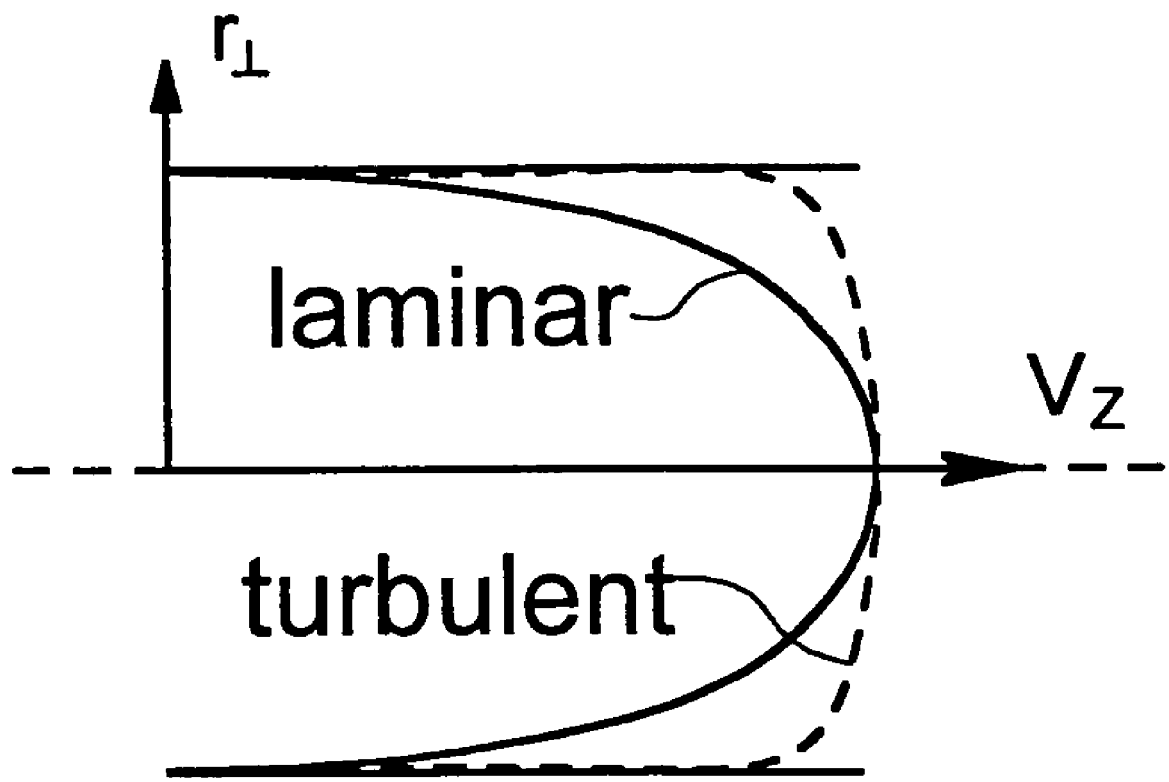
FIG. 5 is a diagrammatic view of the flow pattern in the case of a laminar and, respectively, turbulent flow.

The resulting velocity pattern for a laminar flow is graphically illustrated in FIG. 5 which, for a comparison, also depicts the flow profile of a turbulent flow. The latter is essentially characterized by the fact that there is a relatively minor change of the flow velocity in the inner region, with a strong decline occurring only near the wall of the measuring tube.

It is now possible to quantify the mass transported through the measuring tube per unit of time, based on the following:

$$\dot{m} = \frac{dm}{dt} = 2\pi\rho \int_0^R v_Z(r_\perp) r_\perp \, dr_\perp = \frac{\pi}{8} \frac{\rho}{\eta} R^4 \frac{\Delta p}{L}. \tag{12}$$

This is the well-known Hagen-Poisseuille law that describes the relationship between the mass flow, the fluid density and the dynamic viscosity in a laminar flow.

Since the flow in a Coriolis mass flowmeter is predominantly turbulent, it is necessary to take into account the effect of inertial forces. A key factor here is the amount of energy $\Delta W$ needed to move the mass $\Delta m$ over the length L of the measuring tube. That relationship is determined by $$\frac{\Delta W}{\Delta m} = \frac{\Delta p \pi R^2 L}{\rho \pi R^2 L} = \frac{\Delta p}{\rho}, \tag{13}$$

where, for a laminar flow, $$\Delta p = \frac{8L\eta \dot{m}}{\pi R^4 \rho}. \tag{14}$$

If in this equation $\dot{m}$ is calculated, in accordance with the relation $$\dot{m} = \pi R^2 \rho \bar{v} \tag{15}$$

based on the median flow velocity $\bar{v}$, the result will be:

$$\Delta p = \frac{8L\eta \bar{v}}{R^2}. \tag{16}$$

Entering in this equation the ratio between the frictional forces and the inertial forces, i.e. the Reynolds' number:

$$\text{Re} = \frac{2R\bar{v}\rho}{\eta}, \tag{17}$$

the result will be $$\Delta p = \frac{64}{\text{Re}} \cdot \frac{\rho \bar{v}^2}{2} \cdot \frac{L}{d}. \tag{18}$$

The variable $$p_S = \frac{\rho \bar{v}^2}{2} \tag{19}$$

is generally referred to as dynamic pressure or velocity head while $64/\text{Re} = C_W$ is the coefficient of friction of the flow. The result is $$\frac{\Delta w}{\Delta m} = c_W \frac{P_S L}{\rho d} = \frac{\Delta p}{\rho}. \quad (20)$$

This rule, initially established for laminar flows only, applies universally, i.e. to turbulent flows as well, for as long as the correct coefficient of friction is used. Hence, $C_W$=64/Re for laminar flows, and
$C_W$>>64/Re for turbulent flows.

Figure 6:
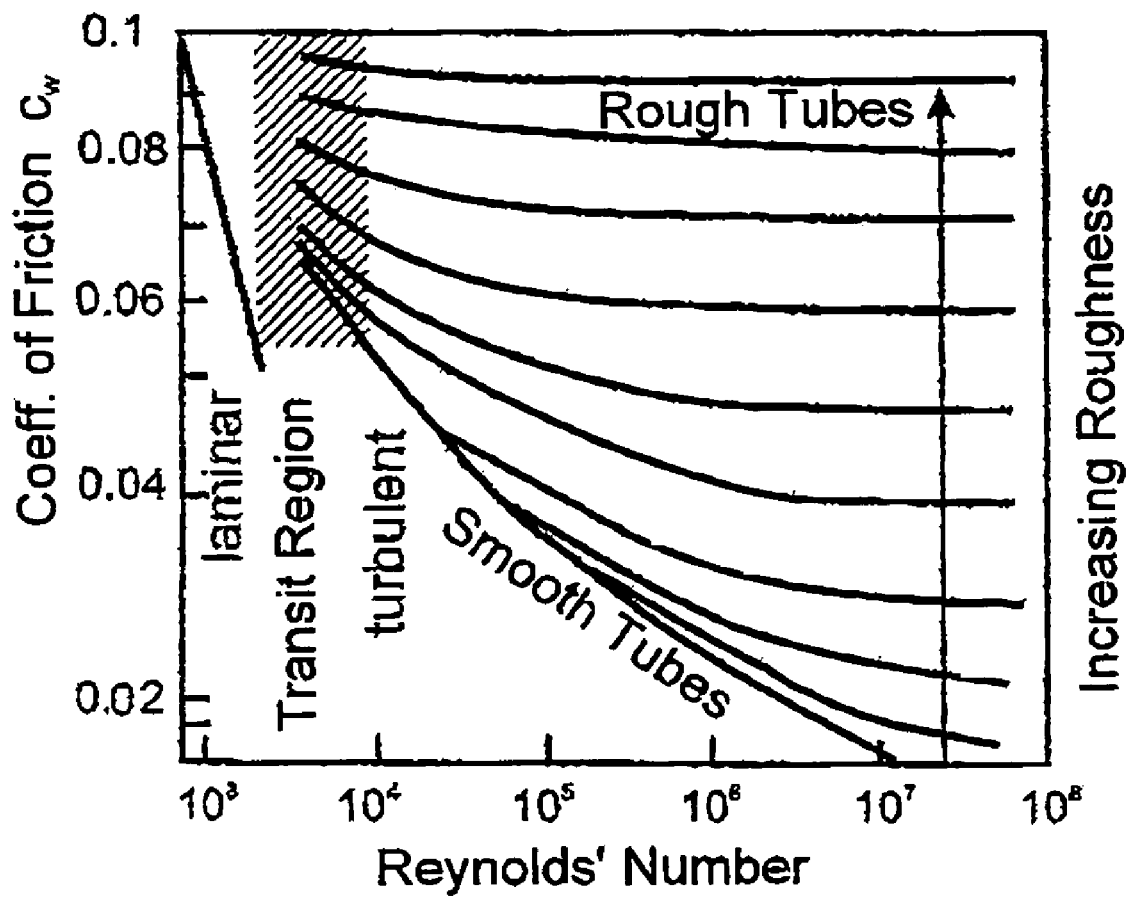
FIG. 6 shows the coefficient of friction as a function of the Reynolds' number for laminar and, respectively, turbulent flows.

FIG. 6 schematically illustrates the dependence of the coefficient of friction on the Reynolds' number. For very high Reynolds' numbers, $C_W$ becomes virtually constant, although it depends on the surface quality of the wall of the measuring tube, i.e. on its relative roughness. In a Coriolis mass flowmeter with a measuring tube diameter for instance of 10 mm, the Reynolds' number for a typical nominal flow rate is about Re=$10^5$, providing sufficient sensitivity between the coefficient of friction $C_W$ and the Reynolds' number. It is thus possible for viscosity measurements to first determine the coefficient of friction $C_W$ and then the associated Reynolds' number by applying the established correlation with the coefficient of friction. This is followed by calculating the viscosity via the equation $$\eta = \frac{2R\bar{v}\rho}{\text{Re}}. \quad (21)$$

For determining the correlation between the coefficients of friction and the associated Reynolds' numbers, values for $C_W$ are measured at different velocities for instance of water. That correlation can then be fairly well approximated by means of a mathematical function.

Differential pressure measurements can be performed using any traditional procedure such as the application of wire strain gauges. A preferred method, however, is as described below, which utilizes two physically different effects:

1. Modifying the elasticity constant of the two halves of the measuring tube 1: For the first effect, the measuring tube 1 is viewed as an elastic element exposed at its input end and, respectively, its output end to mutually different pressures. The intake and outlet halves of the measuring tube thus exhibit different elasticity constants, producing an asymmetric condition in the measuring tube 1. Applied to the model with discrete substitute elements as shown in FIG. 2, this means that the concentrated substitute elastic rigidity values are unevenly modified by the differential pressure ($c_{Ma} \neq c_{Mb}$). Their difference $k_s = c_{Ma} - c_{Mb}$ is a measure of the differential pressure in the measuring tube: $k_s = f(\Delta p)$. This asymmetry of the elasticity constants leads to proportionally deflection-related couplings $k_{sij}$ of the self-resonant modes of the measuring tube 1.

2. Modifying the respective mass of the measuring-tube halves: For the second effect, the differential pressure will compress the compressible phase, if any, at different respective rates for the intake and outlet halves of the measuring tube. As a result, the mass of the intake half of the measuring tube will differ from that of the outlet half, producing an asymmetric condition in the measuring tube 1. Applied to the model with discrete substitute elements as shown in FIG. 2, this means that the concentrated substitute mass values are unevenly modified by the differential pressure ($m_{Ma} \neq m_{Mb}$). Their difference $k_a = m_{Ma} - m_{Mb}$ is a measure of the differential pressure in the measuring tube, provided a flow phase is compressible: $k_a = f(\Delta p)$. This asymmetry of the mass values leads to proportionally acceleration-related couplings $k_{aij}$ of the self-resonant modes of the measuring tube.

In monofrequent frequency operation the proportionally deflection- and acceleration-related couplings are indistinguishable since in their transient state they have the same effect. Quantifying their combined effect does not require a separate determination of $k_{sij}$ and $k_{aij}$; instead, one of their combinations shown below is simply quantifiable in its transient state:

$$k_{saij}(s) = k_{aij}s^2 + k_{sij} \text{ and specially for } k_{sa12}(s) = k_{a12}s^2 + k_{s12} \quad (22)$$

$$k_{asij}(s) = k_{aij} + k_{sij}/s^2 \text{ and specially for } k_{as12}(s) = k_{a12} + k_{s12}/s^2, \quad (23)$$

where s is the Laplace operator. The relation between the equivalent coefficients is:

$$\frac{k_{as12}(s)}{k_{sa12}(s)} = \frac{1}{s^2}. \quad (24)$$

If the frequency is known, the equivalent coefficients can be mutually converted.

Figure 7:
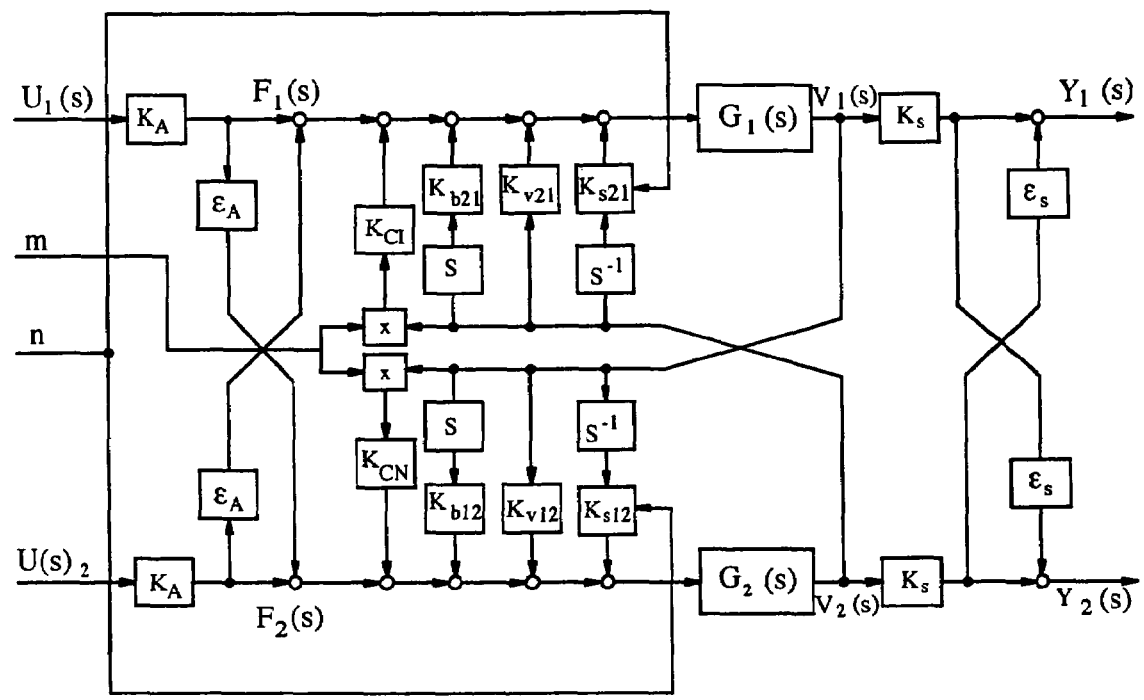
FIG. 7 depicts the structure of a physical-mathematical model for describing the dynamics of a Coriolis mass flowmeter.

FIG. 7 shows examples of couplings between the first self-resonant mode and the second self-resonant mode in terms of the difference in their elastic rigidity values and their respective mass, strictly representing proportionally deflection-related couplings $k_{sa12}$ and $k_{sa21}$.

The symbols in this block diagram represent the following:

$\Delta p$:=differential pressure in the measuring tube
$\dot{m}$:=mass flow
$F_1(s)$:=excitation power within the variable domain for the first self-resonant mode
$V_1(s)$:=velocity signal within the variable domain for the first self-resonant mode
$G_1(s)$:=transfer function of the first self-resonant mode
$k_{sa12}$:=proportionally deflection-related coupling from the first to the second self-resonant mode
$F_2(s)$:=excitation power within the variable domain for the second self-resonant mode
$V_2(s)$:=velocity signal within the variable domain for the second self-resonant mode
$G_2(s)$:=transfer function of the second self-resonant mode
$k_{sa21}$:=proportionally deflection-related coupling from the second to the first self-resonant mode
$K_{CN}$:=mass-flow-related (proportionally velocity-related) coupling from the first to the second self-resonant mode
$K_{CI}$:=mass-flow-related (proportionally velocity-related) coupling from the second to the first self-resonant mode
S: Laplace operator ($S^{-1}$ signifies that the passing signal is phase-shifted by $-90°$).

The proportionally deflection-related couplings via $k_{sa21}$ and $k_{sa12}$ extend perpendicular to the mass-flow-related (proportionally velocity-related) couplings of the self-resonant modes via $K_{CN}$ and $K_{CI}$. This, in essence, provides for the separation of the mass-flow-related and the differential-pressure-related oscillations of the self-resonant modes.

The couplings $k_{saij}$ can be determined by various methods. For example, the coupling $k_{sa12}$ can be measured based on the following relation:

$$k_{sa12} = \frac{\omega_{01}\text{Re}\{V_2(\omega_{01})\}}{\text{Re}\{V_1(\omega_{01})\}\text{Im}\{G_2(\omega_{01})\}}. \quad (25)$$

In this equation, the symbols represent the following:

$k_{sa12}$:=difference in the elastic rigidity values and the masses of the measuring-tube halves $c_{Ma}$-$c_{Mb}$, $\omega_{01}$:=natural frequency of the first self-resonant mode $\text{Re}\{V_1(\omega_{01})\}$:=real component of the velocity signal in the first self-resonant mode $\text{Re}\{V_2(\omega_{01})\}$:=real component of the velocity signal in the second self-resonant mode $\text{Im}\{G_2(\omega_{01})\}$:=imaginary component of the transfer function in the second self-resonant mode.

The conditional equation (Equation (25)) is based on the assumption that 1. the measuring tube 1 oscillates at the natural frequency in the first self-resonant mode $\omega_{01}$, and
2. the real component of the transfer function of the second mode equals zero ($\text{Re}\{G_2(\omega_{01})\}=0$), meaning that at this frequency, the second self-resonant mode behaves like a spring whose elasticity constant is known.

The difference in the elastic rigidity values and the respective mass $k_{sa12}$ and thus the differential pressure can be quantified by a compensation procedure independent of any possible change in the imaginary component of the transfer function in the second self-resonant mode. To that effect, the measured variable $\text{Re}\{V_2(\omega_{01})\}$ is regulated to zero in a control circuit through the stimulation of the second self-resonant mode by applying the excitation force $F_2$. This regulation, as reflected in FIG. 7, forces the condition $F_{2k}=-F_{s12}$. This allows $k_{sa12}$ to be quantified as a measure of the differential pressure using the conditional equation $$k_{sa12} = -\frac{\omega_{01} F_{2K}(\omega_{01})}{\text{Re}\{V_1(\omega_{01})\}}. \quad (26)$$

At this juncture, it must be emphasized that in other preferred embodiments the two effects, i.e. the differential-pressure-related changes in the elastic rigidity values of the measuring-tube halves and the differential-pressure-related changes in the respective mass of the measuring-tube halves can also be employed for differential pressure measurements individually, separately or in some other combination.

The pressure drop in the measuring tube 1 can be calculated on the basis of the measured couplings $k_{saij}$. In the simplest version of the model, that would be:

$$\Delta p = K_{pij} k_{saij} + K_{pij0}, \text{ and specially for } k_{sa12} \quad (27)$$

$$\Delta p = K_{p12} k_{sa12} + K_{p120}. \quad (28)$$

The parameters for this model version or, if applicable, other model versions can be easily pre-established and suitably stored during a calibration of the mass flowmeter. However, they do not always have to be quantified since $k_{saij}$ as a measure of $\Delta p$ is first broken down into its direct and alternating components. The direct component serves as a measure for the viscosity, the alternating component as a measure for the multiphase flow.

The pressure drop $\Delta p$ can be broken down into direct and alternating components using low-pass and high-pass filters. Applying Equation (4), the output of the low-pass filter will be $$\Delta p^* = f_{TP}(\Delta p) \quad (29)$$

and the output of the high-pass filter will be $$\Delta p_{MP} = f_{HP}(\Delta p). \quad (30)$$

For calculating the viscosity-induced pressure drop it is necessary to subtract from the mean value of the pressure drop $\Delta p^*$ the mean value of the pressure drop caused by relative movements, i.e. the peak value $\Delta \hat{p}_{MP}$. If that peak value $\Delta \hat{p}_{MP}$ is difficult to determine due to noise interference, a good approximation is possible by subtracting the estimated variance of $\Delta p_{MP}$. For the viscosity-induced pressure drop, this will result in $$\Delta p_\eta = \Delta p^* - \Delta \hat{p}_{MP} \text{ or} \quad (31)$$

$$\approx \Delta p^* - \hat{\sigma}_{\Delta p_{MP}}, \quad (32)$$

where $\hat{\sigma}_{\Delta p_{MP}}$ is the estimated variance.

The volume-or mass-related component of a flow phase as well can be quantified by any traditional measuring procedure. Preferably, however, the following method is employed:

Relating the multiphase flow-induced power dissipation $p_{MP}$, i.e. the energy loss radially induced by the secondary flow, to the pressure drop caused by the secondary flow, $$q = \frac{p_{MP}}{\Delta p_{MP}}, \quad (33)$$

produces a signal that provides a measure of the relative movement of the flow phases or the volume current $q_s$ of the secondary flow.

The following applies to the volume current $q_s$:

$$q_s = f(V_{1,2}\ldots, \Delta\rho_{1,2}\ldots, \ddot{x}_{1,2}\ldots \text{ flow-phase distribution,}), \quad (34)$$

where $V_{1,2}\ldots$ is the volume component of the flow phase concerned, $\Delta\rho_{1,2}\ldots$ is the density difference between the flow phases, $\ddot{x}_{1,2}\ldots$ is the acceleration of the self-resonant modes and the distribution of the respective flow phases. Under certain conditions, the parameters of the signal $q_s$ can be allocated to one or another of the flow parameters. Such allocation is application-specific and is explained for correspondingly special cases. When the density difference between the two flow phases is significant as in the case of a dual-phase gas-liquid flow, minor changes in the density difference have little impact on the volume current $q_s$. In that case, the volume current $q_s$ responds to the volume component of the gas phase and to the distribution of the gas phase. The frequency spectrum of the volume current serves as a measure for the gas-phase distribution. Allowing for this distribution permits the quantification of the volume component of the gas phase via the signal $q_s$.

The mass flow as a whole can again be measured by any traditional method as described in DE 100 02 635 A1.

Similarly, the density and the process pressure can be quantified by a large variety of established procedures.

As indicated above, the method described here targets not only medium-internal frictional forces but also mass-flow-dependent Coriolis forces, density-related inertial mass forces and pressure-related parameter changes, which is why, in a preferred invention embodiment, that method is also applied, apart from detecting a dual-phase flow, in the simultaneous determination of the mass flow $\dot{m}$, the density $\rho$, the viscosity $\eta$ and the process pressure P, making the data available to the user. The method here described for operating a mass flowmeter lends itself to the simple and cost-effective implementation in conventional Coriolis mass flowmeters and density-measuring instruments.

In conclusion, the following shows the above-referenced energy balance and motion equations.

Energy Balance

Kinetic Energy:

$$E = \frac{1}{2}m_{Ma}(\dot{x}_1 + \dot{x}_2)^2 + \frac{1}{2}m_{Mb}(\dot{x}_1 - \dot{x}_2)^2 + \qquad (35)$$
$$\frac{1}{2}m_{Mm}\dot{x}_1^2 + \frac{1}{2}m_{Ta}(\dot{x}_3 + \dot{x}_4)^2 + \frac{1}{2}m_{Tb}(\dot{x}_3 - \dot{x}_4)^2 +$$
$$\frac{1}{2}m_{tm}\dot{x}_3^2 + \frac{1}{2}m_{Aa}(\dot{x}_5 + \dot{x}_6)^2 + \frac{1}{2}m_{Ab}(\dot{x}_5 - \dot{x}_6)^2$$

Dissipated energy per unit of time:

$$D = \frac{1}{2}d_{Ma}(\dot{x}_1\dot{Y} + \dot{x}_2\dot{Y} - \dot{x}_5\dot{Y} - \dot{x}_6\dot{Y})^2 + \qquad (36)$$
$$\frac{1}{2}d_{Mb}(\dot{x}_1\dot{Y} - \dot{x}_2\dot{Y} - \dot{x}_5\dot{Y} + \dot{x}_6\dot{Y})^2 +$$
$$\frac{1}{2}d_{Ta}(-\dot{x}_3 - \dot{x}_4 + \dot{x}_5 + \dot{x}_6)^2 + \frac{1}{2}d_{Tb}(-\dot{x}_3 + \dot{x}_4 + \dot{x}_5 - \dot{x}_6)^2 +$$
$$\frac{1}{2}d_{Aa}(\dot{x}_5 + \dot{x}_6)^2 + \frac{1}{2}d_{Ab}(\dot{x}_5 - \dot{x}_6)^2 +$$
$$\frac{1}{2}d_m(\dot{x}_1 - \dot{x}_3)^2$$

Potential Energy:

$$U = \frac{1}{2}c_{Ma}(x_1 + x_2 - x_5 - x_6)^2 + \frac{1}{2}c_{Mb}(x_1 - x_2 - x_5 + x_6)^2 + \qquad (37)$$
$$\frac{1}{2}c_{Ta}(-x_3 - x_4 + x_5 + x_6)^2 + \frac{1}{2}c_{Tb}(-x_3 + x_4 + x_5 - x_6)^2 +$$
$$\frac{1}{2}c_{Aa}(x_5 + x_6)^2 + \frac{1}{2}c_{Ab}(x_5 - x_6)^2 +$$
$$\frac{1}{2}c_m(x_1 - x_3)^2$$

Motion Equations $$\frac{d}{dt}\left(\frac{\partial E}{\partial \dot{q}_n}\right) - \frac{\partial E}{\partial q_n} + \frac{\partial D}{\partial \dot{q}_n} + \frac{\partial U}{\partial q_n} = F_n \qquad (38)$$

First self-resonant mode translational movement of the measuring tube along the $x_1$ axis:

$(m_{Ma}+m_{Mb}+m_{Mm})\ddot{x}_1+(d_{Ma}+d_{Mb}+d_m)$
$\dot{x}_1+(c_{Ma}+c_{Mb}+c_m)x_1+(m_{Ma}-m_{Mb})\ddot{x}_2+(d_{Ma}-d_{Mb})$
$\dot{x}_2+(c_{Ma}-c_{Mb})x_2+(-d_m)\ddot{x}_3+(-c_m)x_3+(-d_{Ma}-d_{Mb})$
$\dot{x}_5+(-c_{Ma}-c_{Mb})x_5+(-d_{Ma}+d_{Mb})$
$\dot{x}_6+(-c_{Ma}+c_{Mb})x_6=F_1$ \qquad (39)

Second self-resonant mode rotation of the measuring tube around the $x_2$ axis:

$(m_{Ma}+m_{Mb})\ddot{x}_2+(d_{Ma}+d_{Mb})$
$\dot{x}_2+(c_{Ma}+c_{Mb})x_2+(m_{Ma}-m_{Mb})\ddot{x}_1+(d_{Ma}-d_{Mb})$
$\dot{x}_1+(c_{Ma}-c_{Mb})x_1+(-d_{Ma}+d_{Mb})$
$\dot{x}_5+(-c_{Ma}+c_{Mb})x_5+(-d_{Ma}-d_{Mb})$
$\dot{x}_6+(-c_{Ma}-c_{Mb})x_6=F_2$ \qquad (40)

Translational movement of the support pipe along the $x_3$ axis:

$(m_{Ta}+m_{Tb}+m_{Tm})\ddot{x}_3+(d_{Ta}+d_{Tb}+d_m)$
$\dot{x}_3+(c_{Ta}+c_{Tb}+c_m)x_3+(-d_m)\ddot{x}_1+(-c_m)x_1+(m_{Ta}-m_{Tb})$
$\ddot{x}_4+(d_{Ta}-d_{Tb})\dot{x}_4+(c_{Ta}-c_{Tb})x_4+(-d_{Ta}-d_{Tb})$
$\dot{x}_5+(-c_{Ta}-c_{Tb})x_5+(-d_{Ta}+d_{Tb})$
$\dot{x}_6+(-c_{Ta}+c_{Tb})x_6=-F_1$ \qquad (41)

Rotation of the support pipe around the $x_4$ axis:

$(m_{Ta}+m_{Tb})\ddot{x}_4+(d_{Ta}+d_{Tb})\dot{x}_4+(c_{Ta}+c_{Tb})x_4+(m_{Ta}-m_{Tb})$
$\ddot{x}_3+(d_{Ta}-d_{Tb})\dot{x}_3+(c_{Ta}-c_{Tb})x_3+(-d_{Ta}+d_{Tb})$
$\dot{x}_5+(-c_{Ta}+c_{Tb})x_5+(-d_{Ta}+d_{Tb})$
$\dot{x}_6+(-c_{Ta}-c_{Tb})x_6=-F_2$ \qquad (42)

Translational movement along the $x_5$ axis:

$(m_{Aa}+m_{Ab})\ddot{x}_5+(d_{Ma}+d_{Mb}+d_{Ta}+d_{Tb}+d_{Aa}+d_{Ab})$
$\dot{x}_5+(c_{Ma}+c_{Mb}+c_{Ta}+c_{Tb}+c_{Aa}+c_{Ab})x_5+(-d_{Ma}-d_{Mb})$
$\dot{x}_1+(-c_{Ma}-c_{Mb})x_1+(-d_{Ma}+d_{Mb})$
$\dot{x}_2+(-c_{Ma}-c_{Mb})x_2+(-d_{Ta}-d_{Tb})$
$\dot{x}_3+(c_{Ta}-c_{Tb})x_3+(-d_{Ta}+d_{Tb})$
$\dot{x}_4+(-c_{Ta}+c_{Tb})x_4+(m_{Aa}-m_{Ab})$
$\ddot{x}_6+(d_{Ma}-d_{Mb}+d_{Ta}-d_{Tb}+d_{Aa}-d_{Ab})$
$\dot{x}_6+(c_{Ma}-c_{Mb}+c_{Ta}-c_{Tb}+c_{Aa}-c_{Ab})x_6=F_5$ \qquad (43)

Rotation around the $x_6$ axis:

$(m_{Aa}+m_{Ab})\ddot{x}_6+(d_{Ma}+d_{Mb}+d_{Ta}+d_{Tb}+d_{Aa}+d_{Ab})$
$\dot{x}_6+(c_{Ma}+c_{Mb}+c_{Ta}+c_{Tb}+c_{Aa}+c_{Ab})x_6+(-d_{Ma}+d_{Mb})$
$\dot{x}_1+(-c_{Ma}+c_{Mb})x_1+(-d_{Ma}-d_{Mb})$
$\dot{x}_2+(-c_{Ma}-c_{Mb})x_2+(-d_{Ta}+d_{Tb})$
$\dot{x}_3+(-c_{Ta}+c_{Tb})x_3+(-d_{Ta}-d_{Tb})$
$\dot{x}_4+(-c_{Ta}-c_{Tb})x_4+(m_{Aa}-m_{Ab})$
$\ddot{x}_5+(d_{Ma}-d_{Mb}+d_{Ta}-d_{Tb}+d_{Aa}-d_{Ab})$
$\dot{x}_5+(c_{Ma}-c_{Mb}+c_{Ta}-c_{Tb}+c_{Aa}-c_{Ab})x_5=F_6$ \qquad (44)

The invention claimed is:

1. A method for operating a mass flowmeter that employs the Coriolis principle, said mass flowmeter incorporating a measuring tube through which flows a fluid medium, which measuring tube is stimulated to oscillate in a predefined pattern, allowing the resulting oscillatory response of the measuring tube to be detected and measured, said method comprising the steps of quantifying the drive power level required for stimulating the measuring tube into the predefined oscillation and by means of the quantified drive power detecting the presence of a multiphase flow of the medium traveling through the measuring tube, determining the viscosity of the medium flowing through the measuring tube, based on the viscosity quantifying the viscosity-induced power dissipation and, for determining the power dissipation resulting from the presence of a multiphase flow, subtracting from the drive power level the viscosity-induced power dissipation and the electrical, electromechanical, and mechanical energy losses caused in the stimulation of the measuring tube to a predefined oscillation pattern.

2. The method as in claim 1, including determining the viscosity of the medium flowing through the measuring tube by way of the pressure drop over the length of the measuring tube.

3. The method as in claim 2, including determining the pressure drop along the measuring tube through an evaluation of the oscillary response of the measuring tube on the basis of a physical-mathematical model.

4. The method as in claim 3, wherein the physical-mathematical model is capable of describing the oscillation of the mass flowmeter upon excitation of the measuring tube in at least two mutually different self-resonant modes.

5. The method as in claim 4, wherein the physical-mathematical model takes into account the coupling between the two self-resonant modes.

6. The method as in any one of the claims 1 and 2 to 5, including determining on the basis of the power dissipation occasioned by the presence of a multiphase flow, a value for the radially existing secondary flow.

7. The method as in any one of the claims 1 and 2 to 5, including determining the density of the medium flowing through the measuring tube with the aid of a physical-mathematical model for the oscillation of the mass flowmeter.

8. The method as in any one of the claims 1 and 2 to 5, wherein in the presence of a dual-phase flow, the frequency spectrum of the signal detected for the secondary flow is used for providing information on the distribution of a flow phase and/or as a measure of the proportion of a flow phase.

9. The method as in any one of the claims 1 and 2 to 5, including taking a temperature measurement by means of at least one temperature sensor provided in the mass flowmeter, and using the temperature value thus measured for correcting the effects of thermal factors.

* * * * *